(12) United States Patent
Jakes et al.

(10) Patent No.: US 11,544,169 B2
(45) Date of Patent: Jan. 3, 2023

(54) APPARATUS, METHOD, AND PROGRAM PRODUCT FOR DETERMINING USAGE OF AN INFORMATION HANDLING DEVICE

(71) Applicant: LENOVO (Singapore) PTE. LTD., New Tech Park (SG)

(72) Inventors: Philip Jakes, Durham, NC (US); Jeremy R. Carlson, Cary, NC (US); Daryl C. Cromer, Raleigh, NC (US); Howard Locker, Cary, NC (US); John Weldon Nicholson, Cary, NC (US); Joseph David Plunkett, Raleigh, NC (US); Kenneth Seethaler, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 152 days.

(21) Appl. No.: 17/142,025

(22) Filed: Jan. 5, 2021

(65) Prior Publication Data

US 2022/0214955 A1    Jul. 7, 2022

(51) Int. Cl.
*G06F 11/30* (2006.01)
*G06F 11/07* (2006.01)
*G06F 11/34* (2006.01)

(52) U.S. Cl.
CPC ...... *G06F 11/3058* (2013.01); *G06F 11/0751* (2013.01); *G06F 11/3055* (2013.01); *G06F 11/3409* (2013.01)

(58) Field of Classification Search
CPC .......... G06F 11/0751; G06F 11/3058; G06F 11/3055; G06F 11/3062; G06F 11/32; G06F 11/324; G06F 11/3409; G06F 11/3419; G06F 11/3423
See application file for complete search history.

(56) References Cited

U.S. PATENT DOCUMENTS

| 2005/0131810 | A1* | 6/2005 | Garrett | G06Q 30/04 705/40 |
| 2018/0276061 | A1* | 9/2018 | An | G06F 11/0706 |
| 2022/0201131 | A1* | 6/2022 | Tanchak | G06Q 10/063118 |

* cited by examiner

*Primary Examiner* — Manuel L Barbee
(74) *Attorney, Agent, or Firm* — Kunzler Bean & Adamson; Bruce R. Needham

(57) ABSTRACT

Apparatuses, methods, and program products are disclosed for determining usage of an information handling device. One apparatus includes at least one processor and a memory that stores code executable by the at least one processor. The code is executable by the processor to monitor, by use of the at least one processor, a plurality of parameters indicative of a usage of an information handling device. The plurality of parameters is for a plurality of components of the information handling device. The code is executable by the processor to store data corresponding to the plurality of parameters. The code is executable by the processor to compute the usage of the information handling device based on the stored data.

20 Claims, 5 Drawing Sheets

APPARATUS, METHOD, AND PROGRAM PRODUCT FOR DETERMINING USAGE OF AN INFORMATION HANDLING DEVICE

FIELD

The subject matter disclosed herein relates to information handling devices and more particularly relates to determining usage of information handling devices.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions. It may be difficult to determine a value, life, and/or usage of an information handling device.

BRIEF SUMMARY

An apparatus for determining usage of an information handling device is disclosed. A method and computer program product also perform the functions of the apparatus. In one embodiment, the apparatus includes at least one processor and a memory that stores code executable by the at least one processor. The code, in various embodiments, is executable by the processor to monitor, by use of the at least one processor, a plurality of parameters indicative of a usage of an information handling device. The plurality of parameters is for a plurality of components of the information handling device. The code, in certain embodiments, is executable by the processor to store data corresponding to the plurality of parameters. The code, in some embodiments, is executable by the processor to compute the usage of the information handling device based on the stored data.

In some embodiments, the usage includes a lifetime usage of the information handling device. In one embodiment, the usage includes a usage of the information handling device over a specified time period.

In various embodiments, the code executable by the at least one processor is configured to compute a fair market value of the information handling device based on the usage of the information handling device. In some embodiments, the code executable by the at least one processor is configured to compute a remaining life of the information handling device based on the usage of the information handling device.

A method for determining usage of an information handling device, in one embodiment, includes monitoring, by use of at least one processor, a plurality of parameters indicative of a usage of an information handling device. The plurality of parameters is for a plurality of components of the information handling device. In certain embodiments, the method includes storing data corresponding to the plurality of parameters. In some embodiments, the method includes computing the usage of the information handling device based on the stored data.

In some embodiments, the usage includes a lifetime usage of the information handling device. In various embodiments, the usage includes a usage of the information handling device over a specified time period. In one embodiment, the method includes computing a fair market value of the information handling device based on the usage of the information handling device. In some embodiments, the method includes computing a remaining life of the information handling device based on the usage of the information handling device. In certain embodiments, the method includes computing a remaining life of at least one component of the plurality of components based on the usage of the information handling device.

In some embodiments, the method includes computing warranty information of the information handling device based on the usage of the information handling device. In various embodiments, the method includes determining a component of the plurality of components to be replaced based on the usage of the information handling device. In certain embodiments, the method includes providing a notification of the component to be replaced.

In some embodiments, the plurality of parameters include a power-on time, an awake time, a hibernation time, a sleep time, an amount of time an alternating current is used, an amount of time a direct current is used, a temperature, a time a temperature surpasses a threshold value, a number of rotations, a number of accesses, a cumulative power consumption, a memory bandwidth use, an amount of time memory is accessed, a network traffic use, an amount of time a network is accessed, a humidity, an environmental factor, a carbon dioxide level, an acceleration, a utilization amount, a number of disk operations, a number of page writes, a number of keystrokes, a number of clicks, a number of touch-screen touches, and/or a force applied. In various embodiments, the plurality of components include a central processing unit, a memory, a disk drive, a processor, a display, a keyboard, a mouse, a key, a button, a light, a light emitting diode, a touch-screen, a touch-pad, a camera, a port, a fan, a case, a battery, display hardware, network hardware, input hardware, output hardware, processing hardware, storage hardware, sensing hardware, a hinge and/or other hardware.

In one embodiment, a program product includes a computer readable storage medium that stores code executable by at least one processor. The executable code, in certain embodiments, includes code to perform monitoring, by use of the at least one processor, a plurality of parameters indicative of a usage of an information handling device. The plurality of parameters is for a plurality of components of the information handling device. The executable code, in various embodiments, includes code to perform storing data corresponding to the plurality of parameters. The executable code, in some embodiments, includes code to perform computing the usage of the information handling device based on the stored data.

In certain embodiments, the executable code includes code to perform determining a component of the plurality of components to be replaced based on the usage of the information handling device and providing a notification of the component to be replaced. In one embodiment, the plurality of parameters include a power-on time, an awake time, a hibernation time, a sleep time, an amount of time an alternating current is used, an amount of time a direct current is used, a temperature, a time a temperature surpasses a threshold value, a number of rotations, a number of accesses, a cumulative power consumption, a memory bandwidth use, an amount of time memory is accessed, a network traffic use, an amount of time a network is accessed, a humidity, an environmental factor, a carbon dioxide level, an acceleration, a utilization amount, a number of disk operations, a number of page writes, a number of keystrokes, a number of clicks, a number of touch-screen touches, and/or a force applied.

In certain embodiments, the plurality of components include a central processing unit, a memory, a disk drive, a processor, a display, a keyboard, a mouse, a key, a button, a light, a light emitting diode, a touch-screen, a touch-pad, a camera, a port, a fan, a case, a battery, display hardware, network hardware, input hardware, output hardware, processing hardware, storage hardware, sensing hardware, a hinge and/or other hardware.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
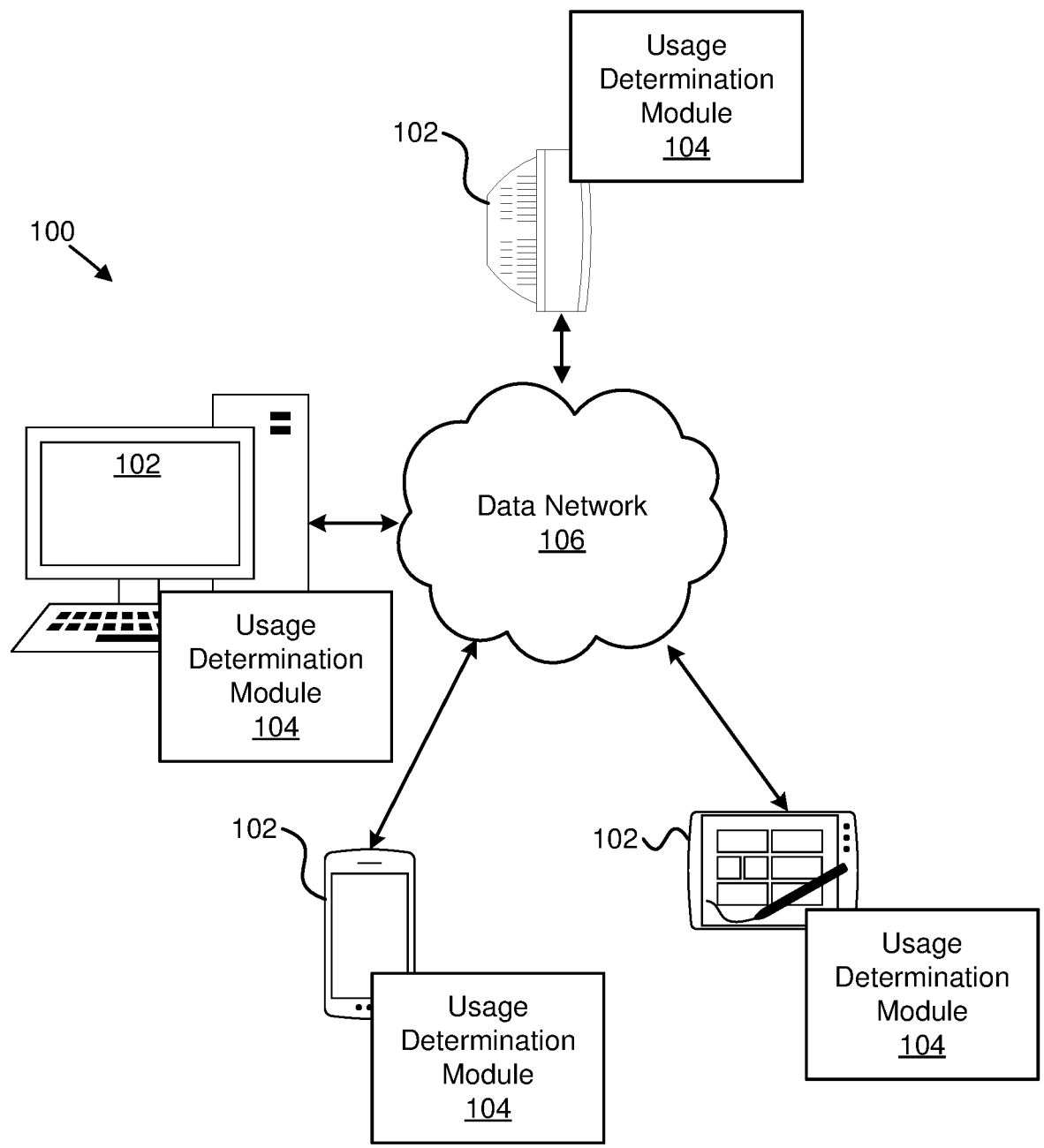
FIG. 1 is a schematic block diagram illustrating one embodiment of a system for determining usage of an information handling device.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for determining usage of an information handling device. In one embodiment, the system 100 includes information handling devices 102, usage determination modules 104, and data networks 106. Even though a specific number of information handling devices 102, usage determination modules 104, and data networks 106 are depicted in FIG. 1, one of skill in the art will recognize that any number of information handling devices 102, usage determination modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, digital assistants (e.g., public digital assistants), or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the usage determination module 104. In certain embodiments, the usage determination module 104 may monitor, by use of at least one processor, a plurality of parameters indicative of a usage of an information handling device (e.g., information handling device 102). The plurality of parameters is for a plurality of components of the information handling device. The usage determination module 104 may also store data corresponding to the plurality of parameters. The usage determination module 104 may compute the usage of the information handling device based on the stored data. In this manner, the usage determination module 104 may be used for determining usage of an information handling device.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
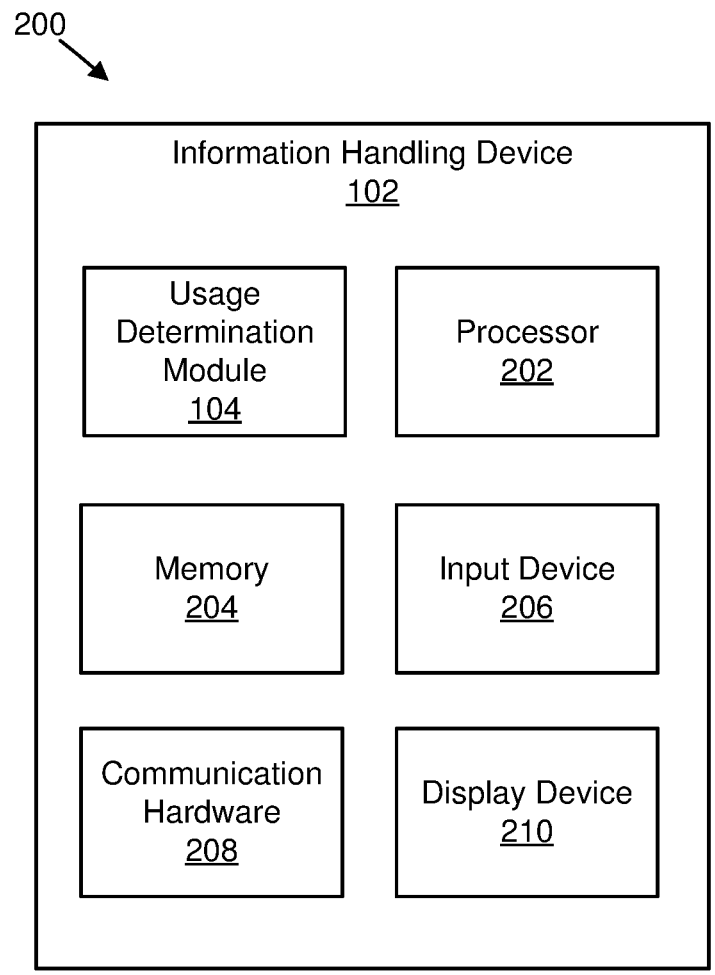
FIG. 2 is a schematic block diagram illustrating one embodiment of an apparatus including an information handling device.

FIG. 2 depicts one embodiment of an apparatus 200 that may be used for determining usage of an information handling device. The apparatus 200 includes one embodiment of the information handling device 102. Furthermore, the information handling device 102 may include the usage determination module 104, a processor 202, a memory 204, an input device 206, communication hardware 208, and optionally a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the usage determination module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores configuration information. In some embodiments, the memory 204 also stores program code and related data, such as an operating system or other controller algorithms operating on the information handling device 102.

The information handling device 102 may use the usage determination module 104 for determining usage of an information handling device. As may be appreciated, the usage determination module 104 may include computer hardware, computer software, or a combination of both computer hardware and computer software. For example, the usage determination module 104 may include circuitry, or the processor 202, used to monitor, by use of at least one processor (e.g., the processor 202), a plurality of parameters indicative of a usage of an information handling device. The plurality of parameters is for a plurality of components of the information handling device. As another example, the usage determination module 104 may include computer program code that stores data corresponding to the plurality of parameters. As a further example, the usage determination module 104 may include computer program code that computes the usage of the information handling device based on the stored data.

The input device 206, in one embodiment, may include any known computer input device including a touch panel, a button, a keyboard, a stylus, a microphone for receiving audio input (e.g., or another audio input device for receiving audio input), or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the usage determination module 104.

In some embodiments, a user of an information handling device 102 may desire to know a remaining life, a value, a usage, and so forth of the information handling device. Described herein are various embodiments that use a usage determination module 104 to determine a remaining life, a value, a usage, and so forth of the information handling device.

Figure 3:
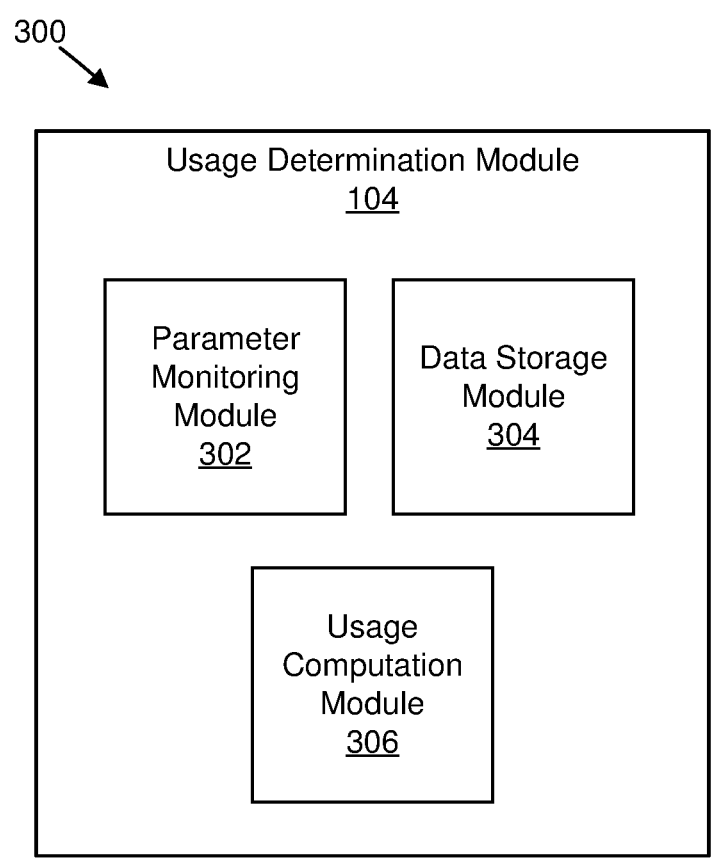
FIG. 3 is a schematic block diagram illustrating one embodiment of an apparatus including a usage determination module.

FIG. 3 depicts a schematic block diagram illustrating one embodiment of an apparatus 300 (e.g., information handling device 102) that includes one embodiment of the usage determination module 104. Furthermore, the usage determination module 104 includes a parameter monitoring module 302, a data storage module 304, and a usage computation module 306.

In certain embodiments, the parameter monitoring module 302 may monitor, by use of at least one processor (e.g., processor 202), a plurality of parameters indicative of a usage of an information handling device (e.g., parameters that may show usage, wear and tear, life used, etc.). The plurality of parameters is for a plurality of components of the information handling device (e.g., one or more parameter per component). In some embodiments, the usage includes a lifetime usage of the information handling device. In various embodiments, the usage includes a usage of the information handling device over a specified time period (e.g., one or more seconds, minutes, hours, days, weeks, months, and/or years).

The plurality of parameters may be monitored via software and/or hardware. The software and/or hardware may include a counter, a tracker, a timer, a temperature sensor, a comparator, a threshold sensor, an audio sensor, a voltage monitor, a current monitor, an alternating current ("AC") monitor, a direct current ("DC") monitor, a power monitor, a pressure sensor, an accelerometer, a gyroscope, a light sensor, a bandwidth monitor, a humidity sensor, a volatile organic compound sensor, a particulate matter sensor, an oxygen sensor, a carbon dioxide ("CO2") sensor, a battery monitor, and/or other software and/or hardware.

In some embodiments, the plurality of parameters include a power-on time, an awake time, a hibernation time, a sleep time, an amount of time an alternating current is used, an amount of time a direct current is used, a temperature, a time a temperature surpasses a threshold value, a number of rotations, a number of accesses, a cumulative power consumption, a memory bandwidth use, an amount of time memory is accessed, a network traffic use, an amount of time a network is accessed, a humidity, an environmental factor, a carbon dioxide level, an acceleration, a utilization amount, a number of disk operations, a number of page writes, a number of keystrokes, a number of clicks, a number of touch-screen touches, and/or a force applied. In various embodiments, the plurality of components include a central processing unit, a memory, a disk drive, a processor, a display, a keyboard, a mouse, a key, a button, a light, a light emitting diode, a touch-screen, a touch-pad, a camera, a port, a fan, a case, a battery, display hardware, network hardware, input hardware, output hardware, processing hardware, storage hardware, sensing hardware, a hinge and/or other hardware.

In certain embodiments, in addition to information currently available from current information handling devices, data collection may be added for: power-on hours for a motherboard; power-on hours for a display; counters for time on AC; counters for time on DC (e.g., DC time may be used as a proxy for heavy use due to mobile usage); tracking of time above a specific temperature threshold; total number of fan rotations; an amount of battery power used over time (e.g., may be used to indicate heavy use vs. light use); memory bandwidth usage; memory time usage; memory bandwidth over time usage; network traffic usage; network time usage; network traffic usage over time (e.g., may indicate light or heavy usage); humidity; temperature; volatile organic compounds; particulate matter; and/or CO2. In such embodiments, additional monitoring and/or sensing may be added to an information handling device without adding cost for sensors, counters, and/or memory by using components that are already part of the system.

In one embodiment, the data storage module 304 may store data corresponding to the plurality of parameters. In some embodiments, the data may be stored using hardware logic, memory, and/or software. In various embodiments, the data may be stored in a secure location and/or may be stored on non-volatile storage. In certain embodiments, the data may be stored in a manner that uses low system overhead. In some embodiments, the data may be automatically stored as it is monitored.

In various embodiments, the usage computation module 306 may computing the usage of the information handling device based on the stored data. The usage computation may be an aggregate of the usage of a number of subsystem and system-level usage statistics (e.g., data from monitored components) so that the usage corresponds to the entire information handling device. For example, subsystem and/or system-level usage statistics may be used to create a score for an overall system being resold, leased, considered for replacement, and/or under repair.

In some embodiments, by combining information from one or more monitored components, it may be determined how much overall power has been used by an information handling device, how much the overall components of an information handling device have been used, how much individual components of an information handling device have been used, and/or how hard an information handling device has been worked over its life (e.g., from the time it was first powered on, from the time it was first powered on by an end user—not including testing time during manufacturing, all time that it has been powered on—whether during manufacturing, testing, and/or end use by one or more users). In such embodiments, the combined information may directly imply how much longer an information handling device is likely to last. The combined information may be used to determine: a value of an information handling device for resale; a potential risk for offering an additional warranty on an information handling device (thereby allowing dynamic pricing such as for a 2nd or 3rd year warranty to be added); a model and or prediction of a cost of replacing a failed (or lowest-scoring) component; a component or system wear to determine a time at which it may be financially cheaper to repair vs. replace; wear leveling for multiple information handling devices of the same type, and so forth.

Figure 4:
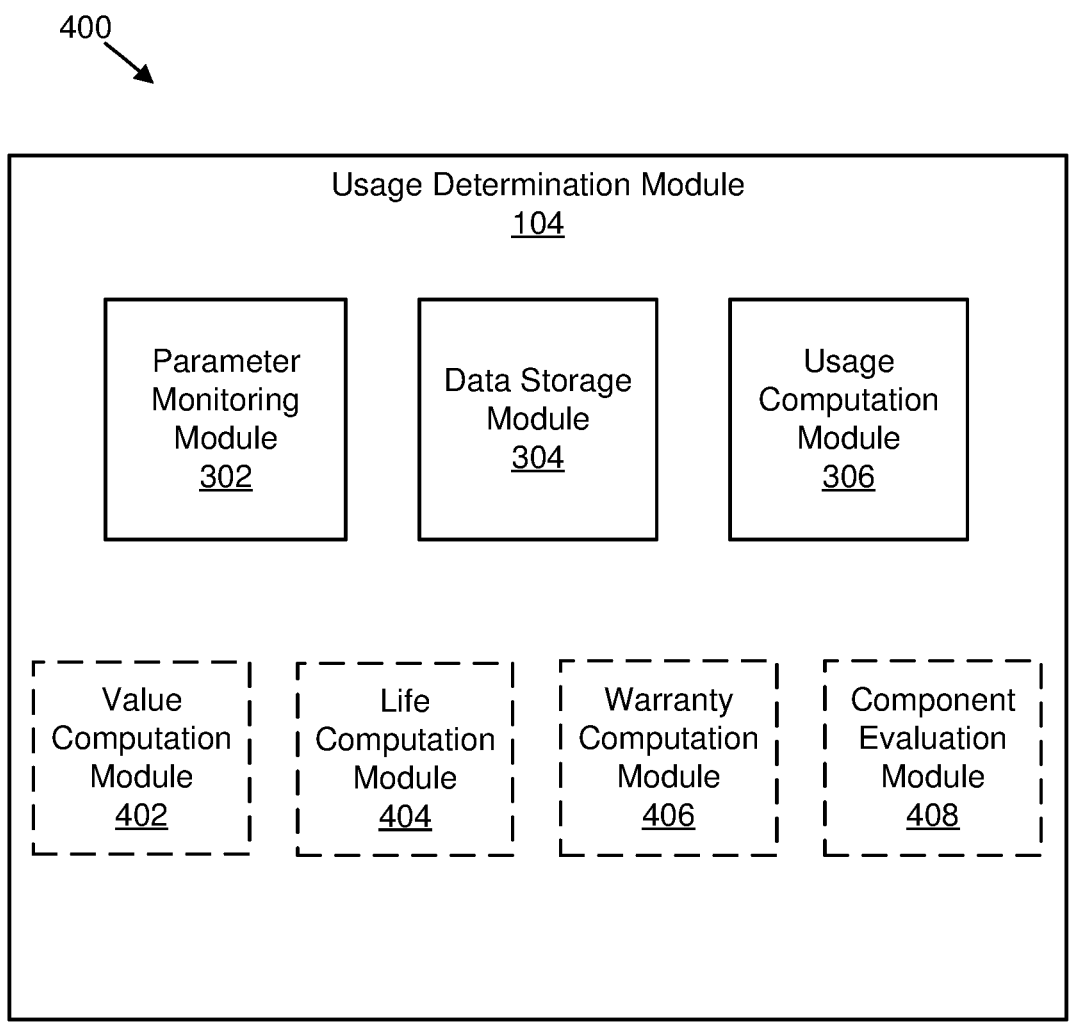
FIG. 4 is a schematic block diagram illustrating another embodiment of an apparatus including a usage determination module.

FIG. 4 is a schematic block diagram illustrating another embodiment of an apparatus 400 that includes one embodiment of the usage determination module 104. Furthermore, the usage determination module 104 includes one embodiment of the parameter monitoring module 302, the data storage module 304, and the usage computation module 306, that may be substantially similar to the parameter monitoring module 302, the data storage module 304, and the usage computation module 306 described in relation to FIG. 3. The usage determination module 104 may optionally include a value computation module 402, a life computation module 404, a warranty computation module 406, and a component evaluation module 408.

The value computation module 402 may compute (e.g., calculate, determine) a fair market value ("FMV") of the information handling device based on the usage of the information handling device (e.g., usage of one or more components of the information handling device). The FMV of an information handling device may be computed using any suitable method.

In one example, the FMV of an information handling device may be computed similarly to how the car industry calculates the FMV of a vehicle. FMV of a vehicle is the price at which the vehicle would change hands between a willing buyer and a willing seller, both having reasonable knowledge of relevant facts and taking into consideration the vehicle's age, condition, mileage, and other history. Mileage is an important factor for determination of FMV of a vehicle. Specifically, low or high mileage affects the value of the car at purchase and sale, as well as likely cost of maintenance and servicing. The average annual mileage for a vehicle is 12,000, so if a vehicle has mileage somewhat less than 60,000 after five years it would be considered low. If the mileage is much more, it may be classified as high.

Similar logic for computing the FMV of a vehicle may be applied to information handling devices for determining the FMV of information handling devices. For example, there may be several measurable physical factors that may be similar to mileage and/or other vehicle data such as the following: on-duration (e.g., not in sleep or hibernate); accelerometer spike events (e.g., due to drops); temperature; central processor unit ("CPU") utilization; disk operations; page writes; number of keystrokes; number of mouse clicks; number of screen taps (e.g., for touchscreens); pressure (e.g., force) applied to a touch control and/or touch pad; and/or other factors. As may be appreciated, the more an information handling device is used, the more the mechanical parts (e.g., keyboard, hard disk drive, and other components) wear out. Furthermore, the more an information handling device is on, there may be fewer cycles on a battery. Moreover, plastics of an information handling device may be impacted by a user's fingerprint oils and so forth. In certain embodiments, data from multiple information handling devices may be used to track keystrokes and power on hours over a large range of similar information handling devices. This information may be used in conjunction with warranty repair information during time period (e.g., 2 years, 3 years, etc.) to compute a probability of and/or time frame for a repair and/or part replacement. In certain embodiments, a computer camera may be used to visually analyze physical wear and tear on devices. One or more of the items described herein that are monitored and/or have data collected for may be used to determine the FMV of an information handling device (e.g., an artificial intelligence program may be used to analyze all data monitored and/or collected to determine the FMV of the information handling device).

In some embodiments, the life computation module 404 may compute (e.g., calculate, determine) a remaining life (e.g., how much longer, a length of time left to use) of the information handling device based on the usage of the information handling device (e.g., usage of one or more components of the information handling device). In various embodiments, the life computation module 404 may compute a remaining life of at least one component of the plurality of components based on the usage of the information handling device (e.g., usage of the one component of the information handling device).

In various embodiments, the warranty computation module 406 may compute (e.g., calculate, determine) warranty information of the information handling device based on the usage of the information handling device (e.g., usage of one or more components of the information handling device). In certain embodiments, the warranty information may include information indicating how much of a warranty is left (e.g., for a warranty based on use from purchase rather than time from purchase). In some embodiments, the warranty information may be used for determining whether it is worthwhile to a user to purchase an extended warranty and/or for a company to determine a length of time for which a warranty should be provided. In various embodiments, the warranty information may be used for future devices for warranty length and/or pricing. In certain embodiments, the warranty information may indicate whether a warranty has been breached.

In some embodiments, the component evaluation module 408 may determine a component of the plurality of components to be replaced based on the usage of the information handling device (e.g., usage of the component of the information handling device). For example, based on a useful life of a component, the component evaluation module 408 may determine how much longer the component should last and/or when the component should be replaced. In various embodiments, the component evaluation module may provide a notification of the component to be replaced (e.g., type of component, name of component, part number of component, wherein the component can be purchased, cost of the component) and/or a time (e.g., date) to replace the component.

Figure 5:
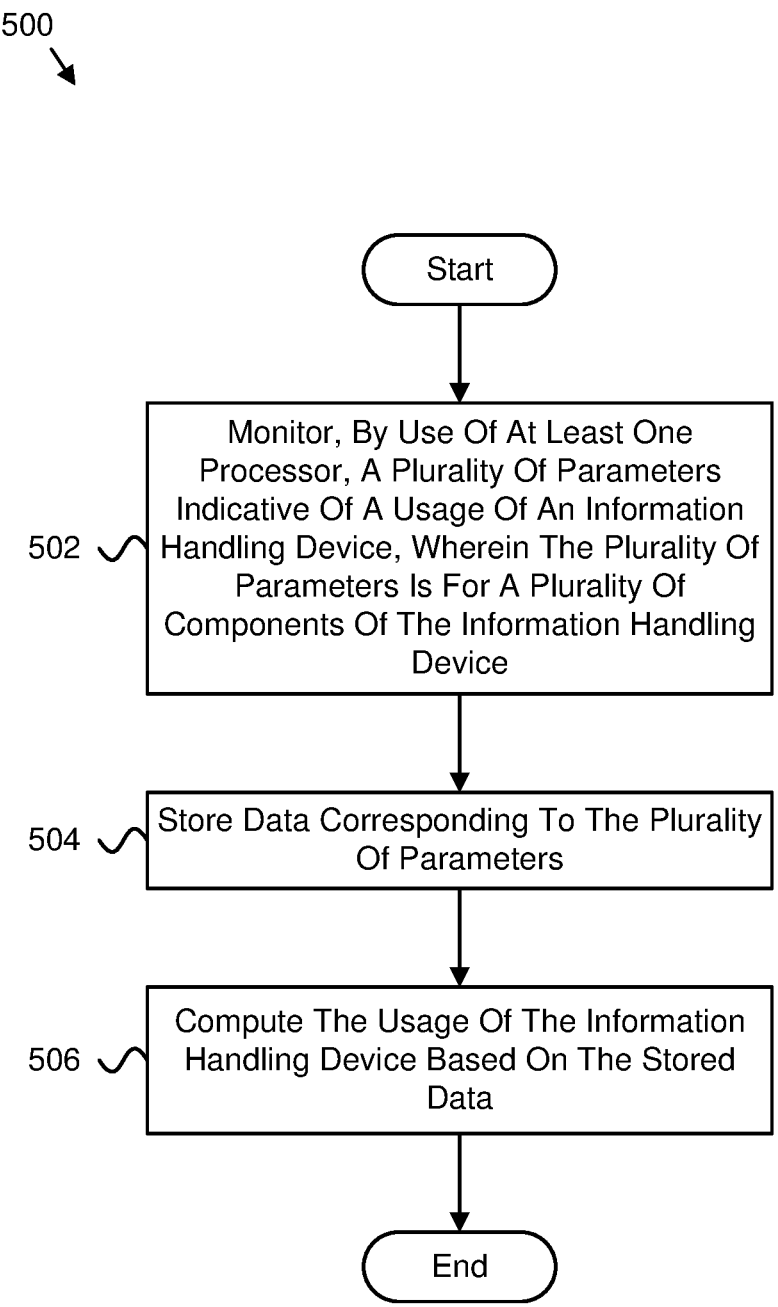
FIG. 5 is a schematic flow chart diagram illustrating an embodiment of a method for determining usage of an information handling device.

FIG. 5 is a schematic flow chart diagram illustrating an embodiment of a method 500 for determining usage of an information handling device. In some embodiments, the method 500 is performed by an apparatus, such as the information handling device 102. In other embodiments, the method 500 may be performed by a module, such as the usage determination module 104. In certain embodiments, the method 500 may be performed by a processor executing program code, for example, a microcontroller, a microprocessor, a CPU, a GPU, an auxiliary processing unit, a FPGA, or the like.

The method 500 may include monitoring 502, by use of at least one processor, a plurality of parameters indicative of a usage of an information handling device. The plurality of parameters is for a plurality of components of the information handling device. In certain embodiments, the parameter monitoring module 302 may monitor 502 the plurality of parameters indicative of the usage of the information handling device.

In some embodiments, the usage includes a lifetime usage of the information handling device. In various embodiments, the usage includes a usage of the information handling device over a specified time period.

In some embodiments, the plurality of parameters include a power-on time, an awake time, a hibernation time, a sleep time, an amount of time an alternating current is used, an amount of time a direct current is used, a temperature, a time a temperature surpasses a threshold value, a number of rotations, a number of accesses, a cumulative power consumption, a memory bandwidth use, an amount of time memory is accessed, a network traffic use, an amount of time a network is accessed, a humidity, an environmental factor, a carbon dioxide level, an acceleration, a utilization amount, a number of disk operations, a number of page writes, a number of keystrokes, a number of clicks, a number of touch-screen touches, and/or a force applied.

In various embodiments, the plurality of components include a central processing unit, a memory, a disk drive, a processor, a display, a keyboard, a mouse, a key, a button, a light, a light emitting diode, a touch-screen, a touch-pad, a camera, a port, a fan, a case, a battery, display hardware, network hardware, input hardware, output hardware, processing hardware, storage hardware, sensing hardware, a hinge and/or other hardware.

The method 500 may include storing 504 data corresponding to the plurality of parameters. In some embodiments, the data storage module 304 may store 504 the data corresponding to the plurality of parameters.

The method 500 may include computing 506 the usage of the information handling device based on the stored data, and the method 500 may end. In some embodiments, the usage computation module 306 may compute 506 the usage of the information handling device based on the stored data.

In one embodiment, the method 500 includes computing a fair market value of the information handling device based on the usage of the information handling device. In some embodiments, the method 500 includes computing a remaining life of the information handling device based on the usage of the information handling device. In certain embodiments, the method 500 includes computing a remaining life of at least one component of the plurality of components based on the usage of the information handling device.

In some embodiments, the method 500 includes computing warranty information of the information handling device based on the usage of the information handling device. In various embodiments, the method 500 includes determining a component of the plurality of components to be replaced based on the usage of the information handling device. In certain embodiments, the method 500 includes providing a notification of the component to be replaced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   at least one processor; and
   a memory that stores code executable by the at least one processor to:
      monitor, by use of the at least one processor, a plurality of parameters indicative of a usage of an information handling device, wherein the plurality of parameters is for a plurality of components of the information handling device;
      store data corresponding to the plurality of parameters;
      compute the usage of the information handling device based on the stored data; and
      compute a fair market value of the information handling device based on the usage of the information handling device.

2. The apparatus of claim 1, wherein the usage comprises a lifetime usage of the information handling device.

3. The apparatus of claim 1, wherein the usage comprises a usage of the information handling device over a specified time period.

4. The apparatus of claim 1, further comprising determining a cost of repair for at least one component of the plurality of components, wherein the fair market value of the information handling device is affected by the cost of repair for the at least one component of the plurality of components.

5. A method comprising:
   monitoring, by use of at least one processor, a plurality of parameters indicative of a usage of an information handling device, wherein the plurality of parameters is for a plurality of components of the information handling device;
   storing data corresponding to the plurality of parameters;
   computing the usage of the information handling device based on the stored data; and
   computing a fair market value of the information handling device based on the usage of the information handling device.

6. The method of claim 5, wherein the usage comprises a lifetime usage of the information handling device.

7. The method of claim 5, wherein the usage comprises a usage of the information handling device over a specified time period.

8. The method of claim 5, further comprising computing warranty information of the information handling device based on the usage of the information handling device.

9. The method of claim 8, wherein the fair market value of the information handling device is affected by the warranty information of the information handling device.

10. The method of claim 5, further comprising determining a component of the plurality of components to be replaced based on the usage of the information handling device.

11. The method of claim 10, further comprising providing a notification of the component to be replaced.

12. The method of claim 10, further comprising computing an increase in a fair market value of the information handling device that would result from replacing the component.

13. The method of claim 5, wherein the plurality of parameters comprise a power-on time, an awake time, a hibernation time, a sleep time, an amount of time an alternating current is used, an amount of time a direct current is used, a temperature, a time a temperature surpasses a threshold value, a number of rotations, a number of accesses, a cumulative power consumption, a memory bandwidth use, an amount of time memory is accessed, a network traffic use, an amount of time a network is accessed, a humidity, an environmental factor, a carbon dioxide level, an acceleration, a utilization amount, a number of disk operations, a number of page writes, a number of keystrokes, a number of clicks, a number of touch-screen touches, a force applied, or some combination thereof.

14. The method of claim 5, wherein the plurality of components comprise a central processing unit, a memory, a disk drive, a processor, a display, a keyboard, a mouse, a key, a button, a light, a light emitting diode, a touch-screen, a touch-pad, a camera, a port, a fan, a case, a battery, display hardware, network hardware, input hardware, output hardware, processing hardware, storage hardware, sensing hardware, a hinge, or some combination thereof.

15. A program product comprising a non-transitory computer readable storage medium that stores code executable by at least one processor, the executable code comprising code to perform:
   monitoring, by use of the at least one processor, a plurality of parameters indicative of a usage of an information handling device, wherein the plurality of parameters is for a plurality of components of the information handling device;
   storing data corresponding to the plurality of parameters;
   computing the usage of the information handling device based on the stored data; and
   computing a fair market value of the information handling device based on the usage of the information handling device.

16. The program product of claim 15, wherein the executable code comprises code to perform determining a component of the plurality of components to be replaced based on the usage of the information handling device and providing a notification of the component to be replaced.

17. The program product of claim 15, wherein the plurality of parameters comprise a power-on time, an awake time, a hibernation time, a sleep time, an amount of time an alternating current is used, an amount of time a direct current is used, a temperature, a time a temperature surpasses a threshold value, a number of rotations, a number of accesses, a cumulative power consumption, a memory bandwidth use, an amount of time memory is accessed, a network traffic use, an amount of time a network is accessed, a humidity, an environmental factor, a carbon dioxide level, an acceleration, a utilization amount, a number of disk operations, a number of page writes, a number of keystrokes, a number of clicks, a number of touch-screen touches, a force applied, or some combination thereof.

18. The program product of claim 15, wherein the plurality of components comprise a central processing unit, a memory, a disk drive, a processor, a display, a keyboard, a mouse, a key, a button, a light, a light emitting diode, a touch-screen, a touch-pad, a camera, a port, a fan, a case, a battery, display hardware, network hardware, input hardware, output hardware, processing hardware, storage hardware, sensing hardware, or some combination thereof.

19. The method of claim 5, further comprising determining wear leveling based on the usage of the information handling device.

20. The program product of claim 15, wherein the executable code comprises code to perform computing a cost of replacing the component to be replaced, wherein the fair market value of the information handling device is affected by the cost of replacing the component.

\* \* \* \* \*